E. BUGATTI.
CAM SHAFT DRIVE.
APPLICATION FILED APR. 20, 1914.

1,124,107.

Patented Jan. 5, 1915.

Witnesses:—

Inventor:—
Ettore Bugatti
by his attorney

UNITED STATES PATENT OFFICE.

ETTORE BUGATTI, OF MOLSHEIM, GERMANY.

CAM-SHAFT DRIVE.

1,124,107.

Specification of Letters Patent.

Patented Jan. 5, 1915.

Application filed April 20, 1914. Serial No. 833,174.

*To all whom it may concern:*

Be it known that I, ETTORE BUGATTI, a subject of the King of Italy, and residing at Molsheim, Alsace, German Empire, have invented certain new and useful Improvements in Cam-Shaft Drives, of which the following is a specification.

The present invention has reference to improvements in cam-shaft drives and relates more specifically to mechanism for driving cam shafts or the like which are acted on in quick succession by oppositely directed forces, as is the case for instance in automobile and the like engines with cam-driven push rods for the valves, and the particular object of the invention is to provide means whereby the rattling or clappering noise, now found in such devices, is completely done away with.

In cam-shafts that are driven by spur gearing there is often heard a disagreeable, continuous rattling, due to the action of the valve springs, which on the valve or valves having exceeded the highest position, cause a sudden forward drive or jumping-ahead of the cam-shaft with corresponding acceleration of the spur wheel fast on this shaft, with the result that the then driving faces of the teeth of this cam-shaft wheel hit against the opposing rear faces of the teeth of the driving spur proper fast on the crank-shaft.

According to this invention the rattling noise is effectively suppressed and the drive made practically noiseless by placing the driven wheel under the continuous action of a braking or retarding mechanism, which prevents sudden accelerations of the cam-shaft wheel and causes the respective flanks of the spur-wheel teeth to remain in permanent operative contact.

The nature of this invention will best be understood when described in connection with the accompanying drawings, in which—

Figure 1:
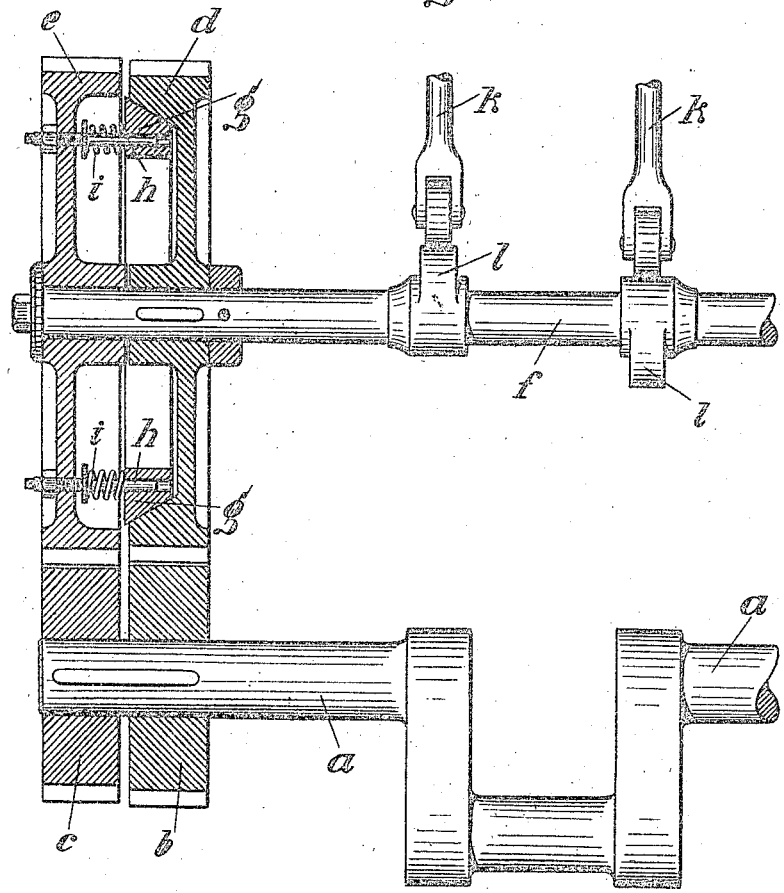
Figure 2:
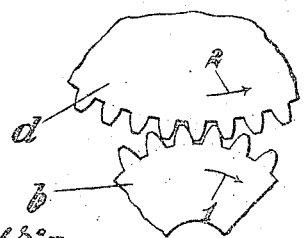
Figure 3:
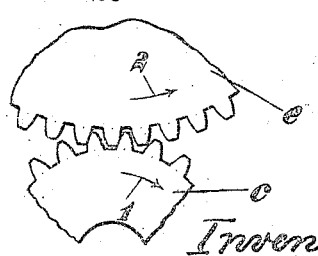

Figure 1 shows a vertical section through the improvement, partly in elevation. Figs. 2 and 3 shows fragmental side elevations of the spur gearings.

To the crank-shaft $a$ are fixed the toothed wheels $b$, $c$, of which the wheel $b$ is of slightly larger diameter than the wheel $c$. These wheels mesh with toothed wheels $e$ and $d$ of correspondingly different diameters, of which the larger wheel $e$ is loose and the smaller wheel $d$ fast on the cam-shaft $f$. Both wheels $e$, $d$ are secured against axial displacement on the cam-shaft, as are also the wheels $b$, $c$. Upon rotation of the crank-shaft the two pairs of wheels $b$, $d$ and $c$, $e$ rotate, the wheel $d$ soon outstripping the wheel $e$. The two cam-shaft wheels $e$, $d$ are elastically interconnected by an adjustable friction coupling, which comprises a conically tapering coupling annulus $g$, which is axially displaceable on suitable supports, as shown on screw studs $h$. These latter are secured in the wheel $e$ and carry the volute springs $i$. By more or less tightening these springs the pressure with which the friction annulus is forced against the correspondingly profiled, dished wheel $d$ can be varied. Upon rotation of the crank-shaft $a$ with the spur-wheels $b$, $c$ in the direction of the arrow 1, the fixed wheel $d$ is driven in the sense of arrow 2, the respective wheel teeth flanks touching as shown in Fig. 2. Owing to the interposed friction coupling the wheel $e$, whose number of revolutions is smaller than that of the wheel $d$, will be dragged along by the latter, as it were; and the wheel $e$ will in turn drive the wheel $c$, fast on the crank shaft $a$, as far as the resistance of the friction coupling allows of this, the teeth of the spur wheels $e$ and $c$ then contacting as shown in Fig. 3. In this coöperation of the spur gears and coupling, the wheel $e$ cannot follow the wheel $d$ with the same speed, but is steadily retarded to some extent by the wheel $c$. In consequence there is set up a certain, barely perceptible slipping between wheel $d$ and the coupling annulus $g$, which slippage is used to act as means for continuously braking (retarding) the wheel $d$. As a result the cam-shaft is prevented from suddenly jumping-ahead upon the push-rods $k$ passing the highest points of the cams $l$, and the cause for the rattling in the valve gear is effectively eliminated.

What I claim is:—

1. In a cam-shaft drive of the character described, a crank-shaft, two toothed wheels of different diameters fast thereon, a cam-shaft, a toothed wheel loose thereon and meshing with the said smaller crank-shaft wheel, a toothed wheel fast on said cam-shaft and meshing with said larger crank-shaft wheel, and an elastic coupling between the said two cam-shaft wheels.

2. In a cam-shaft drive of the character described, in combination, a crank-shaft, a toothed wheel fast thereon, a second toothed wheel alongside thereof, also fast on said crank-shaft and of somewhat larger diameter than the first said toothed wheel; a cam-shaft, a toothed wheel loose thereon and meshing with the first said crank-shaft wheel, a second toothed wheel fast on said cam-shaft, of somewhat smaller diameter than the first said cam-shaft wheel and meshing with said larger crank-shaft wheel; and a drag coupling device interposed between the said two cam-shaft wheels, comprising a friction annulus carried by one of the latter wheels, and adjustable means for keeping said annulus pressed more or less firmly against the respective other wheel.

3. In a cam-shaft drive of the character described, in combination, a crank-shaft, a toothed wheel fast thereon, a second toothed wheel fast on said crank-shaft and of somewhat larger diameter than the first said toothed wheel; a cam-shaft, a toothed wheel loose thereon and meshing with the smaller crank-shaft wheel, a dished toothed wheel fast on said cam-shaft, with the dished side facing the said loose cam-shaft wheel, of somewhat smaller diameter than the said latter wheel and meshing with the said larger crank-shaft wheel; and a coupling device interposed between the said two cam-shaft wheels, comprising supports axially extending from said loose cam-shaft wheel, a friction annulus profiled to coöperate with the dished face of said fast cam-shaft wheel and carried by said supports, and adjustable means for regulating the operative friction pressure of said annulus against said dished cam-shaft wheel.

In testimony whereof I affix my signature in presence of two witnesses.

ETTORE BUGATTI.

Witnesses:
 JOSEPH ROHMER,
 CHARLES A. HALLEY, Jr.